W. F. GALLOWAY.
INTEREST COMPUTING DEVICE.
APPLICATION FILED JUNE 11, 1919.

1,336,900.

Patented Apr. 13, 1920.
2 SHEETS—SHEET 1.

| 00.05000 | 0010000 | 0015000 | 0020000 | 0025000 | 0000000 | 0035000 | 0040000 | 0045000 | 1 Yr |
| 0010000 | 0020000 | 0030000 | 0040000 | 0050000 | 0060000 | 0070000 | 0080000 | 0090000 | 2 Yr |
| 0015000 | 0030000 | 0045000 | 0060000 | 0075000 | 0090000 | 0105000 | 0120000 | 0135000 | 3 Yr |
| 0020000 | 0040000 | 0060000 | 0080000 | 0100000 | 0120000 | 0140000 | 0160000 | 0180000 | 4 Yr |
| 0025000 | 0050000 | 0075000 | 0100000 | 0125000 | 0150000 | 0175000 | 0200000 | 0225000 | 5 Yr |
| 0000417 | 0000833 | 0001250 | 0001667 | 0002083 | 0002500 | 0002917 | 0003333 | 0003750 | 1 Mo |
| 0000833 | 0001667 | 0002500 | 0003333 | 0004167 | 0005000 | 0005833 | 0006667 | 0007500 | 2 Mo |
| 0001250 | 0002500 | 0003750 | 0005000 | 0006250 | 0007500 | 0008750 | 0010000 | 0011250 | 3 Mo |
| 0001667 | 0003333 | 0005000 | 0006667 | 0008333 | 0010000 | 0011667 | 0013333 | 0015000 | 4 Mo |
| 0002083 | 0004167 | 0006250 | 0008333 | 0010417 | 0012500 | 0014583 | 0016667 | 0018750 | 5 Mo |
| 0002500 | 0005000 | 0007500 | 0010000 | 0012500 | 0015000 | 0017500 | 0020000 | 0022500 | 6 Mo |
| 0002917 | 0005833 | 0008750 | 0011667 | 0014583 | 0017500 | 0020417 | 0023333 | 0026250 | 7 Mo |
| 0003333 | 0006667 | 0010000 | 0013333 | 0016667 | 0020000 | 0023333 | 0026667 | 0030000 | 8 Mo |
| 0003750 | 0007500 | 0011250 | 0015000 | 0018750 | 0022500 | 0026250 | 0030000 | 0033750 | 9 Mo |
| 0004167 | 0008333 | 0012500 | 0016667 | 0020833 | 0025000 | 0029167 | 0033333 | 0037500 | 10 Mo |
| 0004583 | 0009167 | 0013750 | 0018333 | 0022917 | 0027500 | 0032083 | 0036667 | 0041250 | 11 Mo |
| 0000042 | 0000083 | 0000125 | 0000167 | 0000208 | 0000250 | 0000292 | 0000333 | 0000375 | 2 Da |
| 0000083 | 0000167 | 0000222 | 0000278 | 0000333 | 0000369 | 0000444 | | | 4 Da |
| 0000139 | 0000208 | 0000278 | 0000347 | 0000417 | 0000486 | 0000556 | | | 5 Da |
| 0000097 | 0000194 | 0000292 | 0000389 | 0000486 | 0000583 | 0000667 | 0000756 | | 6 Da |
| 0000111 | 0000222 | 0000333 | 0000444 | 0000556 | 0000667 | 0000778 | 0000875 | 0001000 | 7 Da |
| 0000125 | 0000250 | 0000375 | 0000500 | 0000625 | 0000750 | 0000875 | 0001000 | 0001125 | 9 Da |
| 0000139 | 0000278 | 0000417 | 0000556 | 0000694 | 0000833 | 0000972 | 0001111 | 0001250 | 10 Da |
| 0000153 | 0000306 | 0000458 | 0000611 | 0000764 | 0000917 | 0001069 | 0001222 | 0001375 | 11 Da |
| 0000167 | 0000333 | 0000500 | 0000667 | 0000833 | 0001000 | 0001167 | 0001333 | 0001500 | 12 Da |
| 0000181 | 0000361 | 0000542 | 0000722 | 0000903 | 0001083 | 0001264 | 0001444 | 0001625 | 13 Da |
| 0000194 | 0000389 | 0000583 | 0000778 | 0000972 | 0001167 | 0001361 | 0001556 | 0001750 | 14 Da |
| 0000208 | 0000417 | 0000625 | 0000833 | 0001042 | 0001250 | 0001458 | 0001667 | 0001875 | 15 Da |
| 0000222 | 0000444 | 0000667 | 0000889 | 0001111 | 0001333 | 0001556 | 0001778 | 0002000 | 16 Da |
| 0000236 | 0000472 | 0000708 | 0000944 | 0001181 | 0001417 | 0001653 | 0001889 | 0002125 | 17 Da |
| 0000250 | 0000500 | 0000750 | 0001000 | 0001250 | 0001500 | 0001750 | 0002000 | 0002250 | 18 Da |
| 0000264 | 0000528 | 0000792 | 0001056 | 0001319 | 0001583 | 0001847 | 0002111 | 0002375 | 19 Da |
| 0000278 | 0000556 | 0000833 | 0001111 | 0001389 | 0001667 | 0001944 | 0002222 | 0002500 | 20 Da |
| 0000292 | 0000583 | 0000875 | 0001167 | 0001458 | 0001750 | 0002042 | 0002333 | 0002625 | 21 Da |
| 0000306 | 0000611 | 0000917 | 0001222 | 0001528 | 0001833 | 0002139 | 0002444 | 0002750 | 22 Da |
| 0000319 | 0000639 | 0000958 | 0001278 | 0001597 | 0001917 | 0002236 | 0002556 | 0002875 | 23 Da |
| 0000333 | 0000667 | 0001000 | 0001333 | 0001667 | 0002000 | 0002333 | 0002667 | 0003000 | 24 Da |
| 0000347 | 0000694 | 0001042 | 0001389 | 0001736 | 0002083 | 0002431 | 0002779 | 0003125 | 25 Da |
| 0000361 | 0000722 | 0001083 | 0001444 | 0001806 | 0002167 | 0002528 | 0002889 | 0003250 | 26 Da |
| 0000375 | 0000750 | 0001125 | 0001500 | 0001875 | 0002250 | 0002625 | 0003000 | 0003375 | 27 Da |
| 0000389 | 0000778 | 0001167 | 0001556 | 0001944 | 0002339 | 0002722 | 0003111 | 0003500 | 28 Da |
| 0000403 | 0000806 | 0001208 | 0001611 | 0002014 | 0002417 | 0002819 | 0003222 | 0003625 | 29 Da |
| 0000417 | 0000833 | 0001250 | 0001667 | 0002083 | 0002500 | 0002917 | 0003333 | 0003750 | 30 Da |

Inventor
W. F. Galloway.

By Watson E. Coleman
Attorney

W. F. GALLOWAY.
INTEREST COMPUTING DEVICE.
APPLICATION FILED JUNE 11, 1919.

1,336,900.

Patented Apr. 13, 1920.
2 SHEETS—SHEET 2.

| | | | | | | | | | |
|---|---|---|---|---|---|---|---|---|---|
| | | | | | | | | | |
| 0010000 | 0020000 | 0030000 | 0040000 | 0050000 | 0060000 | 0070000 | 0080000 | 0090000 | 1 yr |
| 0020000 | 0040000 | 0060000 | 0080000 | 0100000 | 0120000 | 0140000 | 0160000 | 0180000 | 2 yr |
| | | | | | | | | | |
| 0000833 | 0001667 | 0002500 | 0003333 | 0004167 | 0005000 | 0005833 | 0006667 | 0007500 | 1 mo |
| 0001667 | 0003333 | 0005000 | 0006667 | 0008333 | 0010000 | 0011667 | 0013333 | 0075000 | 2 mo |
| | | | | | | | | | |
| | | | | | | | | | |
| 0000028 | 0000056 | 0000083 | 0000111 | 0000139 | 0000167 | 0000194 | 0000222 | 0000250 | 1 da |
| 0000056 | 0000111 | 0000167 | 0000222 | 0000278 | 0000333 | 0000389 | 0000444 | 0000500 | 2 da |

Inventor
W. F. Galloway.

By Watson E. Coleman
Attorney

UNITED STATES PATENT OFFICE.

WILLIAM F. GALLOWAY, OF LITTLE ROCK, ARKANSAS.

INTEREST-COMPUTING DEVICE.

1,336,900.  Specification of Letters Patent.  Patented Apr. 13, 1920.

Application filed June 11, 1919. Serial No. 303,317.

*To all whom it may concern:*

Be it known that I, WILLIAM F. GALLOWAY, a citizen of the United States, residing at Little Rock, in the county of Pulaski and State of Arkansas, have invented certain new and useful Improvements in Interest-Computing Devices, of which the following is a specification, reference being had to the accompanying drawings.

This invention relates to an improved interest computing device including a decimal guide placed over and movable down a page on which figures, representing computations of interest on large sums, are printed, and having means for indicating the location of the decimal, so that by so locating the decimal, the interest on large and small sums, ranging from 10¢ to $9,000 may be ascertained. Any rate of interest on any amount above or below $9,000 may be ascertained.

The invention also aims to ascertain the interest according to the days, months and years, for instance for each day of the month, and for each month of the year, and for each of a series of years, say for instance, 5%.

It is to be understood that different amounts than those shown, on which interest at the rate of five per cent. is to be computed may be printed on the computing movable guide. Also it is to be understood that the device may be constructed so that various amounts may be computed at other rates of interest than at five per cent. In other words, amounts may be computed at one per cent., two per cent., three per cent., four per cent., six per cent. and the like.

The invention further aims to provide an interest computing device including a decimal guide or indicator, constructed of white celluloid, or other suitable substance.

The invention further aims to provide an interest computing device including a decimal guide extending across the page, and provided with downwardly extending end flanges to overlie the side edges of the pages, in order to hold the guide in its proper position, so that any one of the series of points on the upper edge of the guide will gradually aline with the space between the figures or numerals on the page, whereby the location of the decimal may be indicated, according to the amount on which the interest at any suitable per cent., for instance 5%, can be ascertained, by reading off the amount according to the location of the decimal point.

The invention further aims to provide an interest computing device including a white decimal guide having printed on its upper face a plurality of series of amounts, one series ranging from 10¢ to $1000, or any amount desired, another from 20¢ to $2000 or any amount desired, the amounts in the first instance between 10¢ and $1000 being $1, $10, and $100, the amounts between 20¢ and $2000 being $2, $20, and $200, etc. up to $9000, as illustrated, in combination with a plurality of a series of points on an edge of the guide to indicate the location of the decimal point. These points are arranged in registration with the various amounts on the guide, and which amounts are positioned relatively to the figures or numerals on the page, so that the points will aline with the spaces between the figures or numerals on the page, whereby as the guide is moved down the page, any selected point will indicate the location of the decimal point, so that by reading the amount according to the decimal point, the amount of interest on any given sum can be ascertained.

The invention further aims to arrange the amounts on which interest is to be computed, in a series, which are numbered from 1 to 9 inclusive.

While the design and construction at present set forth and illustrated is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view of a folder, one cover or side of it being open, disclosing a page of figures or numerals in columns representing the amount of interest on various sums, according to the series of years, months and days and illustrating the decimal guide in position.

Fig. 2 is a sectional view on line 2—2 of Fig. 1.

Fig. 3 is a detail perspective view of the decimal guide.

Fig. 4 is a detail view of another page, indicating the interest on certain of the series of years, and certain of the series of months and days, at 10%, that is on certain amounts, such as are indicated or printed on the guide.

Referring to the drawings, 1 designates a folder or portfolio, which comprises the opposing stiff backs 2, hingedly united in a conventional manner as shown at 3, whereby either may fold toward and from the other. Suitable means such as indicated at 4 is provided, so as to hold a series of loose pages between the sides or backs of the folder or portfolio. The pages are designed to be super-imposed, and have their opposite side and end edges flush.

The page illustrated in Fig. 1 has printed thereon columns of numerals or figures representing the interest on certain amounts, according to the years, months and days. These numerals or figures are designated by the numeral 5. On the right of the columns of figures or numerals there is disclosed a column 6 of years, months and days. The bottom of this page has printed thereon 5%, indicating that the amounts in the columns on the page represent the interest at 5% on various sums.

Also as illustrated in Fig. 1, a white decimal guide is positioned across the page. This decimal guide may be constructed of any suitable material, such as non-transparent white celluloid, though not necessarily, for it is obvious that transparent celluloid may be used. However, in this application it is deemed advisable to use a non-transparent white celluloid, so that the numerals or figures on the sheet below can not be seen, that is in actual practice, thereby avoiding confusion. The object in hiding the numerals on the sheet under the guide, is to permit the reader to only read the first line of numerals or figures appearing just above the toothed edge of the decimal guide, thereby avoiding confusion with the numerals or figures on the sheet under the guide. However, for the purpose of illustration, Fig. 1 shows the guide as constructed of transparent celluloid, whereby those who may eventually examine the drawings in this patent may easily read the numerals or figures on the sheet under the transparent guide, in order to know the exact rates of interest on certain amounts, according to days, for the drawing shows the guide over the rates of interest for days. In Fig. 4, the decimal guide is designed to be constructed of white non-transparent celluloid or any other similar suitable material. The guide may be any suitable shape or configuration and its ends are provided with downwardly extending flanges 8. These flanges 8 are designed to engage the opposite side edges of the pages of the folder or portfolio, so as to hold the decimal guide exactly transversely of the pages, so that the upper toothed edge of the guide will be in parallelism with each line of figures or numerals representing the rates of interest on various sums. Adjacent the upper edge of the guide there is printed a plurality of series of amounts, such as indicated at 12. These series of figures or numerals on the guide represent the sums on which interest at 5% or any suitable rate of interest is to be computed. Also printed on the upper face of the guide there are spaces $a$, marked off by transverse and longitudinally extending lines $b$ and $c$, and these spaces $a$ are numbered from 1 to 9 inclusive. Therefore, it is obvious that should it be desired to ascertain the interest on 10¢, $1, $10, $100, or $1000, attention is directed to the group of amounts above the space 1, and should it be desired to ascertain the interest at 5% on 50¢, $5, $50, $500 or $5000, attention is directed to the group of numerals adjacent space 5. In other words, these groups are numbered according to the maximum amount of each group. In fact, the amounts below the maximum amount of each group also begins with the figure which is the number of the space under the selected group. Carried by the guide preferably forming an integral part thereof, though not necessarily, is a hand or finger gripping device, which is in the form of an elongated rib 14, which may be grasped, so that the decimal guide may be moved down the page. It is obvious that this handle or finger gripping device may be dispensed with if so desired, for it may be readily seen that the guide may be moved by grasping the guide at its opposite ends.

In the operation of the decimal computing device, it is the aim to select the amount on which interest at any rate is to be computed. For instance, if it is desired to ascertain the interest on 10¢ for one day, the guide is moved down the page until the edge 15 of the guide is immediately below the numerals or figures to the left of the column containing the days, months and years. It will be observed that one of the points 16 will aline with the space between the first two ciphers of the number in the first column of the page, and it may be ascertained that the interest on 10¢ for one day at 5% will be .000014. Should it be desired to ascertain the interest on $9000 for one day at 5%, the point opposite $9000 on the guide will be positioned between the space of the numerals 1 and 2 of the amount indicated in the 9th column of the page, which will be $1.25 for one day at 5%. Should it be desired to ascertain the interest on $9000 for one year at 5%, the guide is moved up the page, in which case the point opposite $9000 will aline the space between the second and third cyphers of the amount opposite one year, which would be $450. This method of ascertaining the interest on various amounts at any rate desired for days, months and years may be followed, according to the amount selected on the guide, and rate shown on bottom of the page. It is possible to find the interest at any rate desired on $30, $20, $40, $50, etc., as will be clearly apparent upon examination of the drawing. It will be seen that the folder or portfolio contains a number of pages, and these pages may be printed with numerals or figures representing the various rates of interest on different sums, according to certain rates of interest, similar to the pages that are illustrated in Figs. 1 and 2, and by turning the various pages, and using the decimal guide on the page that discloses the desired interest on a certain sum at a certain rate, according to the rate indicated at the bottom of the page, the interest on said sum may be ascertained by manipulating the decimal guide as described in connection with Fig. 1. It is to be understood that the figures in the various columns may be increased in value, for it is obvious that the pages may be made wider, and also it is apparent that the decimal guide may be lengthened correspondingly, so that the interest on any desired amount up to $10,000,000,000 (or even more) at any desired rate may be ascertained.

The invention having been set forth, what is claimed as new and useful is:

1. In an interest computing device, the combination with a page provided with a plurality of series of columns of numbers or figures representing interest on various sums for a day, or a series thereof, or for a month or a series thereof, or for a year or a series thereof, of a decimal guide movable down the page having a plurality of groups of amounts printed thereon on which interest is adapted to be ascertained, the upper edge of the guide having a plurality of groups of points, the points of each group being alined with the amounts opposite the respective group of points.

2. In an interest computing device, the combination with a page having printed thereon a plurality of columns of numerals or figures representing the interest on certain sums, for a day or a series thereof, or for a month or a series thereof, or for a year or a series thereof, of a guide movable down the page having printed thereon a plurality of groups of numbers, on which interest is designed to be computed, the upper edge of the guide having a plurality of series of points alined with the amounts of the groups of numbers, whereby the location of the decimal point may be indicated according to any selected amount of any group.

3. A decimal guide, comprising a body having downwardly extending end flanges to hold the guide transversely over the page containing columns of numerals representing the interest on certain amounts, the upper edge of the guide having a plurality of series of points, to indicate the location of the decimal point in any number of any selected column on the page, according to the amount on which interest is designed to be computed, the upper face of the guide having printed thereon a plurality of groups of numbers, any selected number of which of any group may be computed by a certain selected point of the series thereof adjacent the group of numbers.

In testimony whereof I hereunto affix my signature in the presence of two witnesses.

WILLIAM F. GALLOWAY.

Witnesses:
 D. A. BRAY,
 BRUCE FRASER.